US008588526B2

(12) United States Patent
Sato

(10) Patent No.: US 8,588,526 B2
(45) Date of Patent: *Nov. 19, 2013

(54) VISUALIZATION PROGRAM, VISUALIZATION METHOD AND VISUALIZATION APPARATUS FOR VISUALIZING READING ORDER OF CONTENT

(71) Applicant: International Business Machines Corporation, Armonk, NY (US)

(72) Inventor: Daisuke Sato, Kanagawa (JP)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 13/677,395

(22) Filed: Nov. 15, 2012

(65) Prior Publication Data

US 2013/0071027 A1   Mar. 21, 2013

Related U.S. Application Data

(63) Continuation of application No. 12/844,462, filed on Jul. 27, 2010, now Pat. No. 8,340,424.

(30) Foreign Application Priority Data

Jul. 30, 2009 (JP) ................................. 2009-177902

(51) Int. Cl.
*G06K 9/34* (2006.01)
(52) U.S. Cl.
USPC ............................. 382/176; 382/173; 382/179
(58) Field of Classification Search
USPC ......... 382/173, 176, 112, 159, 177, 157, 187, 382/228, 161, 203, 309, 179; 358/1.18, 358/1.16; 706/12; 345/467
See application file for complete search history.

(56) References Cited

U.S. PATENT DOCUMENTS 7,528,986 B2    5/2009  Kato
8,340,424 B2 * 12/2012  Sato .............................. 382/176

FOREIGN PATENT DOCUMENTS

| JP | 7192084 A | 7/1995 |
| JP | 10021330 A | 1/1998 |
| JP | 11250041 A | 9/1999 |
| JP | 2001101164 A | 4/2001 |
| JP | 2001109612 A | 4/2001 |

(Continued)

OTHER PUBLICATIONS

Wendy Chisholm, Gregg Vanderheiden, Ian Jacobs, "Web Content Accessibility Guidelines 1.0" W3C Recommendations May 5, 1999, http://www.w3.org/TR/1999/WAI-WEBCONTENT-1990505.

(Continued)

*Primary Examiner* — Anh Do
(74) *Attorney, Agent, or Firm* — Cantor Colburn LLP; Vazken Alexanian

(57) ABSTRACT

A visualization program, method and apparatus for determining reading order of content in a structured document. The method includes generating, for each of a plurality of elements, a directed segment; storing, in the reading order, the generated directed segments of the elements into a storage device; reading from the storage device; linking together the directed segments for the elements in accordance with the reading order; and displaying the linked directed segments overlaid on the structured document which is displayed on the screen. A computer implemented program and an apparatus for carrying out the above method are also provided.

15 Claims, 14 Drawing Sheets

(56) References Cited

FOREIGN PATENT DOCUMENTS

| | | | |
|---|---|---|---|
| JP | 2005010992 | A | 1/2005 |
| JP | 2006171544 | A | 6/2006 |
| JP | 2007102715 | A | 4/2007 |
| JP | 2007256529 | A | 10/2007 |
| JP | 2008077171 | A | 4/2008 |
| JP | 2008171356 | A | 7/2008 |

OTHER PUBLICATIONS

Leonard R. Kasday, PhD., "A Tool to Evaluate Universal Web Accessibility", Institute on Disabilities/UAP at Temple University Philadelphia PA 19122, 2000, pp. 161-162.

Jin Zhu, et al., "Proposal of Multilingual Method Based on Image Conversion of Character & Component" IPSJ SIG Tech. Report 2007, 01-26, vol. 2007, p. 25-31.

\* cited by examiner

VISUALIZATION PROGRAM, VISUALIZATION METHOD AND VISUALIZATION APPARATUS FOR VISUALIZING READING ORDER OF CONTENT

CROSS REFERENCE TO RELATED APPLICATION

This application is a continuation of U.S. patent application Ser. No. 12/844,462 now U.S. Pat. No. 8,340,424, filed Jul. 27, 2010, which claims priority to Japanese Patent Application No. 2009-177902 filed Jul. 30, 2009, and all the benefits accruing therefrom under 35 U.S.C. §119, the contents of which in its entirety are herein incorporated by reference.

BACKGROUND OF THE INVENTION

1. Field of the Invention

The present invention relates to a technique for visualizing an order of reading content contained in a structured document such as an HTML document. Particularly, the present invention relates to a technique that facilitates a check on the reading order.

2. Description of the Related Art

A text-to-speech application such as a screen reader or a voice browser reads content contained in a structured document such as an HTML document in an order set in a DOM (Document Object Model) tree. Thus, the content has to be written in an order based on the meanings (meaningful order) so as to be made easily understandable when being read. Such a requirement is mentioned also in Check Point 6.1 in Web Content Accessibility Guidelines 1.0 published as W3C (World Wide Web Consortium) recommendation.

The reading order of the content has been checked so far by the text-to-speed application such as the screen reader in order to check whether or not the content is written in a meaningful order.

One method for the checking is conversion into text. This checking method converts content into text such as: displaying source code of the HTML document; displaying the HTML document in a layout with a style sheet turned off; or displaying an output result from a tool that simulates a reading operation of a screen reader.

Another method is a checking method by displaying sequence numbers. This is a method in which an HTML document in the designed layout is displayed with sequence numbers in the reading order overlaid thereon (for example, refer to Kasday, L. R., "A Tool to Evaluate Universal Web Accessibility", Proc. the 2000 Conference on Universal Usability (ACM), pp. 161-162, 2000).

There are also techniques for checking a reading position in an entire webpage. For example, Japanese Unexamined Patent Application Publication No. 2001-109612 discloses a technique of specifying information, by use of tags, for displaying a part within a specified range in a visually distinguished manner. This technique makes it possible to make settings such as displaying a range specified as a reading target with its background color, character color or character size changed from the other part, or displaying the range in a shaded manner. In addition, Japanese Unexamined Patent Application Publication No. 2006-171544 discloses a technique of presenting a reading position by making use of an audio attribute such as pitch, length, or strength of a voice. According to this technique, the audio attribute can be changed as the reading position proceeds from one to another. Japanese Unexamined Patent Application Publication No. 2005-010992 further discloses a technique aimed at enhancing a Webpage's function of transmitting information to a user. In this technique, a webpage is written, including descriptions with tags specifying texts to be read and the order of reading these texts.

In the checking method by conversion into text, however, it is difficult to comprehend a correspondence relationship between each of the content expressed in text and the content laid out by the style sheet. For this reason, the checking method by conversion into text involves a problem in that the checking requires a long time, and a problem that the method is not intuitive and therefore cannot be fully utilized by a beginner.

On the other hand, in the checking method by displaying the sequence numbers, the reading order can be accurately comprehended. However, in the checking method by displaying the sequence numbers, the sequence numbers have to be tracked one by one for comprehending a flow of the reading order of the content. For this reason, this checking method also requires a long time for comprehending local interchange of the sequence numbers and comprehending an entire flow of the reading order of the content.

Additionally, each of the techniques of Japanese Unexamined Patent Application Publication No. 2001-109612 and Japanese Unexamined Patent Application Publication No. 2006-171544 allows checking on a current reading position. Each of these techniques, however, does not allow checking on reading positions before and after the current reading position, such as reading positions immediately before and after the current reading position. For this reason, even the techniques of Japanese Unexamined Patent Application Publication No. 2001-109612 and Japanese Unexamined Patent Application Publication No. 2006-171544 have a problem of not enabling comprehension of an entire flow of the reading order of the content and of local interchange of sequence numbers in the order.

Moreover, the technique of Japanese Unexamined Patent Application Publication No. 2005-010992 makes it possible to read the content in a meaningful order even in a case where the content is not written in a meaningful order. However, this method requires a description specifying the reading order to be previously written in a structured document by use of tags. This method is therefore laborious. In addition, since there is a risk of there being a mistake in the specification of the reading order, the technique of Japanese Unexamined Patent Application Publication No. 2005-010992 cannot eliminate the need for checking whether the reading order is correctly specified.

SUMMARY OF THE INVENTION

The present invention is made to solve the above problems, and an object of the present invention is to provide a technique that facilitates a check on a reading order of content contained in a structured document. Another object of the present invention is to provide a technique that enables easy comprehension of local interchange in a reading order of content in a structured document; and an entire flow of the reading order of the content.

In one aspect, the present invention provides visualization method for visualizing a reading order in which a screen reading application reads elements contained in a structured document displayed on a screen of a computer system including a processor device and storage device, the method comprising the steps of:

generating, for each of a plurality of elements, a directed segment which includes a character string to be read by a screen reading application on the basis of a writing direction of the character string in the element, wherein the directed segment indicates the writing direction and is displayed in an element region in which the character string in the element is displayed on the screen;

storing, in the reading order, the generated directed segments of the elements into the storage device;

reading from the storage device;

linking together the directed segments generated for the elements in accordance with the reading order; and displaying the linked directed segments overlaid on the structured document which is displayed on the screen;

wherein each of said steps is carried out by said processor device.

In another embodiment of the invention, a computer program product for determining a reading order in which a screen reading application reads elements contained in a structured document displayed on a screen of the computer system is provided. The computer program product includes a computer readable storage medium having a computer readable program code.

In another aspect, the present invention provides an article of manufacture tangibly embodying computer readable instructions which, when implemented, cause a computer processor to carry out the steps of a method for visualizing a reading order in which a screen reading application reads elements contained in a structured document displayed on a screen of a computer system including a processor device and storage device, according to the above method.

In yet another aspect, the present invention provides a visualization apparatus for determining a reading order in which a screen reading application reads elements contained in a structured document displayed on a screen of a computer system is provided. The apparatus includes: directed segment generating means for generating a directed segment which includes a character string to be read by a screen reading application; a storage device that stores therein the generated directed segments; and overlay rendering means for reading from the storage device, linking together the directed segments generated for the elements in accordance with the reading order, and for displaying the linked directed segments overlaid on the structured document.

BRIEF DESCRIPTION OF THE DRAWINGS

For a more complete understanding of the present invention and the advantage thereof, reference is now made to the following description taken in conjunction with the accompanying drawings.

DETAILED DESCRIPTION OF THE PREFERRED EMBODIMENT

Figure 1:
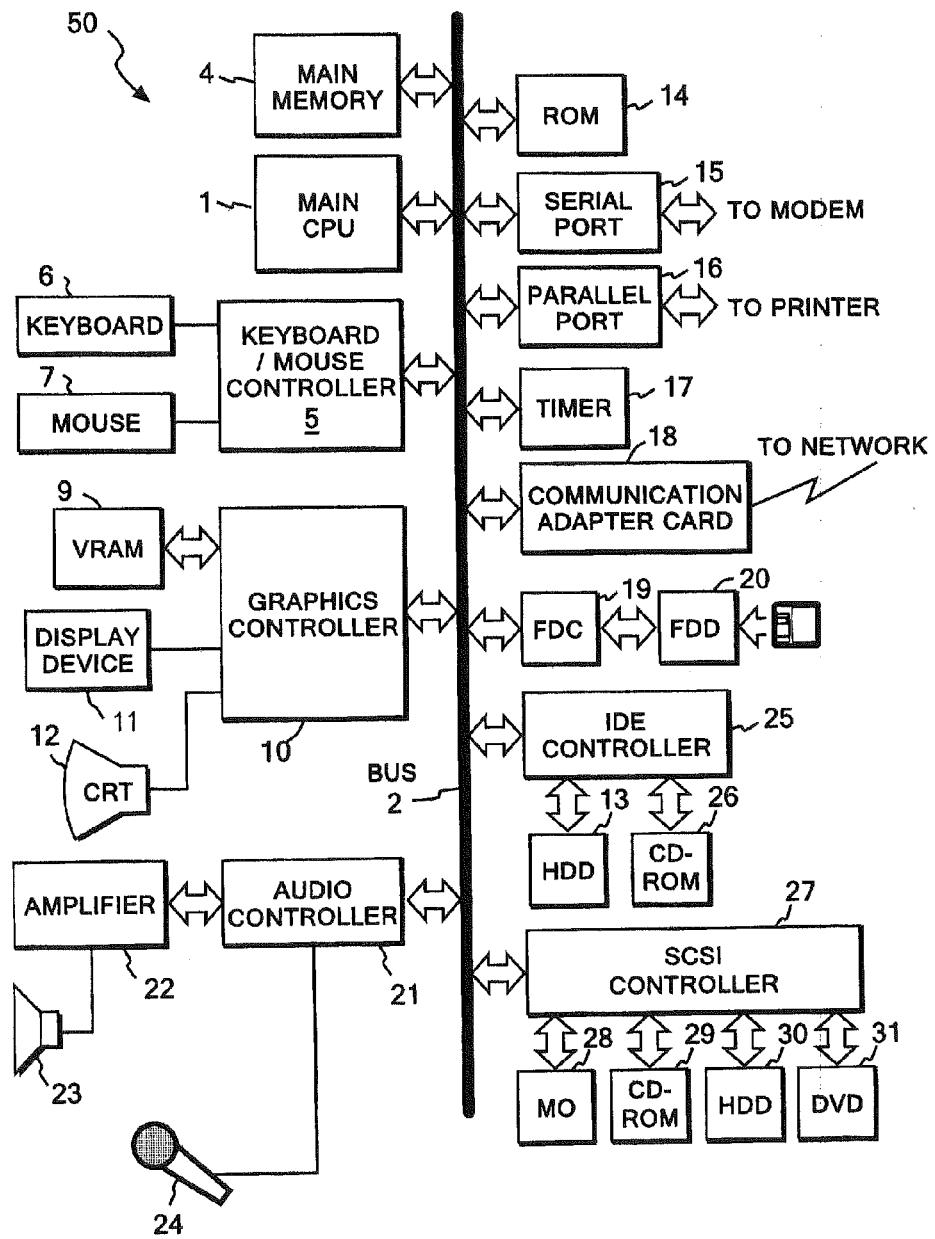
FIG. 1 shows one example of a hardware configuration of a computer system 50 according to an embodiment of the present invention.

In order to achieve the above object, the present invention is configured to visually present a flow of a reading order by rendering a structured document and then displaying thereon the order in which elements in the structured document are read. Specifically, the present invention which is provided to achieve the above object may be implemented by the following visualization program which is executed in a computer system including a processor and a storage device. An embodiment of the present invention provides a visualization program that determines a reading order in which a screen reading application reads elements contained in a structured document displayed on a screen of the computer system.

The visualization program causes the computer system to execute a method. The method includes: generating a directed segment for each of a plurality of elements which includes a character string to be read by the application on the basis of a writing direction of the character string in the element. The directed segment indicates the writing direction and is displayed in an element region in which the character string in the element is displayed on the screen. The method further includes storing the generated directed segments of the elements into the storage device in the reading order; reading from the storage device and linking together the directed segments for the elements in accordance with the reading order, and then displaying the linked directed segments overlaid on the structured document which is displayed on the screen.

Here, each element contained in the structured document and used as a unit for the processing of generating a directed segment may be any part of the structured document. The part includes one character, one line, one image, one control which denotes a form-related component such as a button or a combo box text input, one node which denotes a node in a DOM tree, one element which denotes an element in a DOM tree, or the like. However, which one of these elements is used as the processing unit is predetermined. Additionally, a directed segment generated for an element is not limited to a straight line and may be a curve.

Preferably, the writing direction of the character string in the element is determined on the basis of at least any one of language information on a language setting, and writing direction information indicating a writing direction, where the language information and the writing direction information are specified within the structured document.

Additionally and preferably, under a condition that an element is in an element region having a height not less than a given height in a case where the element region has a rectangular shape and the writing direction therein is lateral, the directed segment for the element is generated as a segment indicating the writing direction and extending diagonally in the element region. If an element is in an element region having a width not less than a given width in a case where the element region has a rectangular shape and the writing direction therein is vertical, the directed segment for the element is generated as a segment which indicates the writing direction and extends diagonally in the element region.

Additionally and preferably, in a case where an element is in an element region having a height less than a given height under a condition that the writing direction is lateral and the element region has a rectangular shape, the directed segment for the element is generated as a segment indicating the writing direction and extending horizontally in the element region. In a case where an element is in an element region having a height not less than a given height under a condition that the writing direction is lateral and the element region has a rectangular shape, the directed segment for the element is generated as a segment indicating the writing direction and extending diagonally in the element region.

Additionally and preferably, the visualization program causes the computer system to further execute the steps of: the processor acquiring an abstraction parameter from a user via an input device of the computer system, where the abstraction parameter indicates a level of abstraction according to which the directed segments are displayed. Further, the processor reads, from the storage device, a combination of two directed segments for each combination of two elements adjacent in the reading order, and synthesizes the two directed segments in the read combination until the number of the directed segments stored in the storage device is reduced to the number corresponding to an abstraction level indicated by the abstraction parameter, or until there are no synthesizable directed segments left in the storage device. Also, the processor updates the directed segments stored in the storage device in accordance with a result of the synthesizing.

Preferably, the synthesizing of each of the combinations which consists of two directed segments is performed by generating a directed segment for a minimum region encompassing the element regions of the two directed segments.

Preferably, the synthesizing of each of the combinations of two directed segments is preferentially performed on a combination of two directed segments that forms a minimum region which encompasses the corresponding two element regions and is closer to a union of the corresponding two element regions.

Additionally and preferably, the synthesizing of each of the combinations which consists of two directed segments is preferentially performed on a combination of two directed segments which are similar to each other in direction and in size.

Additionally and preferably, the synthesizing of each of the combinations of two directed segments is preferentially performed on a combination of two directed segments that forms a smaller union of the corresponding two element regions.

Additionally and preferably, the synthesizing of each of the combinations of two directed segments is preferentially performed on a combination of two directed segments whose corresponding two element regions are horizontally or vertically lined up.

Additionally and preferably, the synthesizing step further includes the step of prohibiting the processor from synthesizing a combination of two directed segments for a combination of two elements that are adjacent to each other in the reading order, in any case where, under a condition that horizontal components of the writing directions of the two elements are oriented from left to right, the element region of one of the two elements that comes later in the reading order is located to the left of or above the element region of the other one of the two elements that comes earlier in the reading order, and where, under a condition that horizontal components of the writing directions of the two elements are oriented from right to left, the element region of one of the two elements that comes later in the reading order is located to the right of or above the element region of the other one of the two elements that comes earlier in the reading order.

Additionally and preferably, the synthesizing step further includes the step of prohibiting the processor from synthesizing a combination of two directed segments for a combination of two elements that are adjacent to each other in the reading order, in a case where one of the two elements that comes earlier in the reading order is displayed at a predetermined or longer distance apart from a position where the other one of the two elements that comes later in the reading order is displayed.

More preferably, when being displayed in an overlaid manner on the structured document, the combination of the two directed segments prohibited from being synthesized is displayed so as to be distinguishable from those of the directed segments that are not prohibited from being synthesized.

Additionally and preferably, the directed segments are linked by use of a Bezier curve.

The present invention has been described as a visualization program for visualizing an order in which elements in a structured document displayed on a screen of a computer system are read by a screen reading application.

However, the present invention can also be construed as: a recording medium, in which the visualization program is recorded, for visualizing an order in which elements in a structured document are read; a visualization apparatus, which is implemented by installing the visualization program into a computer, for visualizing an order in which elements in a structured document are read; or a visualization method, which is executed by the visualization apparatus, for visualizing an order in which elements in a structured document are read.

According to the present invention, a flow of a reading order is visually presented by rendering a structured document and then displaying thereon the order in which elements in the structured document are read. This makes it easy to check an order in which content contained in the structured document is read. This also enables comprehension of local interchange in the order in which the content in the structured document is read and of an entire flow of the reading order of the content. Other effects of the present invention will be understood from description of embodiments.

Hereinafter, the best mode for carrying out the present invention will be described in detail based on the drawings. However, the following embodiment is not intended to limit the invention according to the scope of claims, and not all combinations of characteristics described in the embodiment are essential for solving means of the invention. Note that same reference numerals are used for the same elements throughout the entire description of the embodiment.

FIG. 1 is a diagram showing one example of a hardware configuration of a computer system 50 suitable for realizing a visualization apparatus according to an embodiment of the present invention. The computer system 50 includes a main CPU (Central Processing Unit) 1 and a main memory 4 both of which are connected to a bus 2. Removable storage and external storage systems using replaceable recording media such as hard disk drives 13 and 30, CD-ROM drives 26 and 29, a flexible disk drive 20, an MO drive 28, and a DVD drive 31 are connected to the bus 2 through a flexible disk controller 19, an IDE controller 25, an SCSI controller 27.

Storage media such as a flexible disk, an MO, a CD-ROM, and a DVD-ROM are inserted into the removable storage. Computer program code for implementing the present invention by giving commands to the CPU and the like in cooperation with the operating system can be recorded in these storage media, the hard disk drives 13 and 30, and a ROM 14. That is, the above described various storages of the computer system 50 serving as a visualization apparatus can store therein an application to display a structured document on a screen of the computer system 50, and a visualization program for visualizing an order in which elements contained in a structured document displayed on the screen are read. Then, the main CPU 1 executes these plural computer programs by loading these computer programs into the main memory 4. Each of the computer programs can be recorded on plural media by being compressed or divided into plural parts.

The computer system 50 receives an input from an input device such as a keyboard 6 or a mouse 7 via a keyboard/mouse controller 5. Via an audio controller 21, the computer system 50 receives an input from a microphone 24 and outputs sound from a speaker 23. The computer system 50 is connected, via a graphics controller 10, to a display device 11 for presenting visual data to a user. The computer system 50 is connected to a network through a network adapter 18 (an Ethernet (Registered trademark) card or a token ring card) or the like, and thus can communicate with different computers and the like.

The above description makes it easy to understand that the computer system 50 suitable for realizing the visualization apparatus according to the embodiment of the present invention can be implemented by any one of usual information processing apparatuses such as a personal computer, a workstation, and a mainframe, or by combination of these information processing apparatuses. Note that the above described constituents are provided as examples, and not all of those constituents are essential for the present invention.

Figure 2:
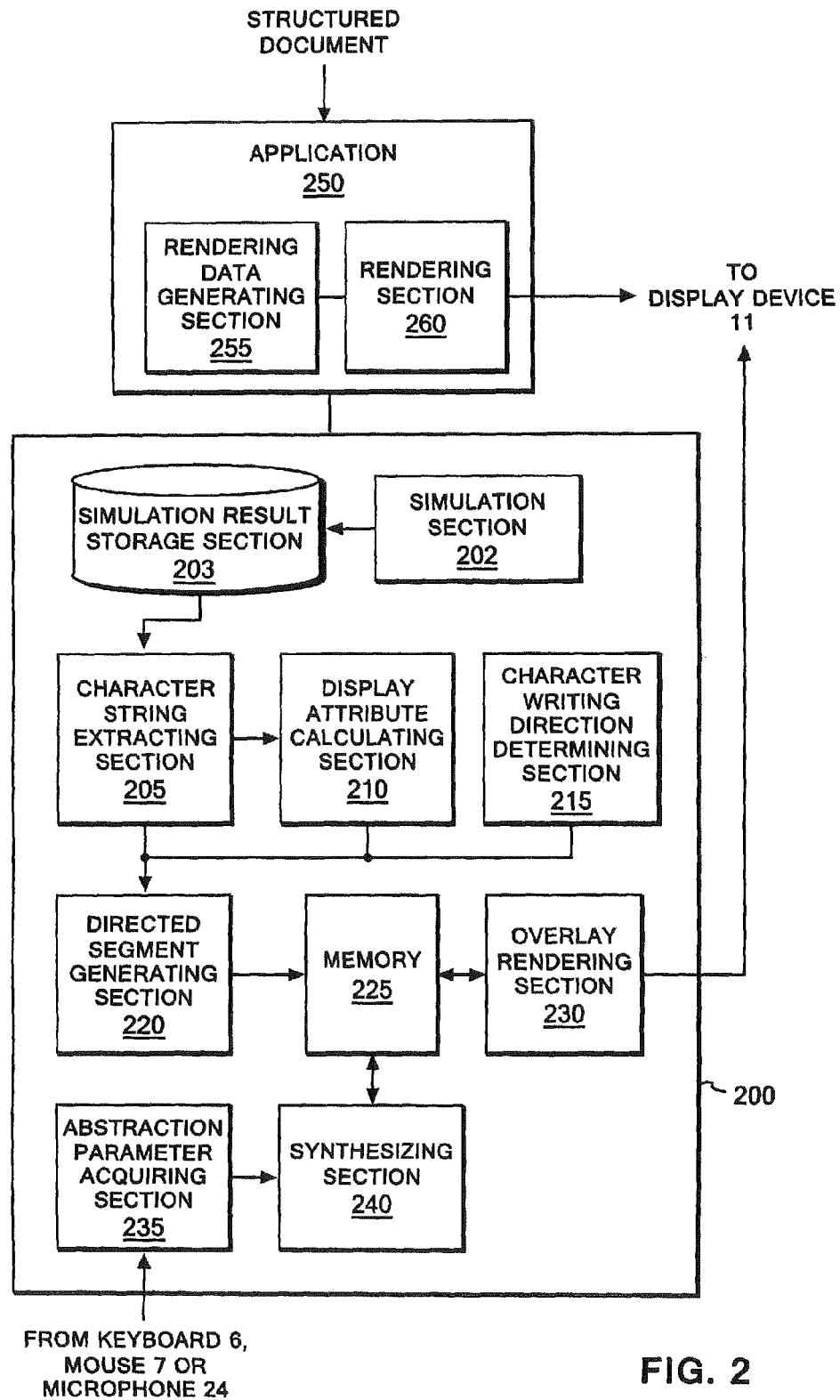
FIG. 2 shows one example of a functional configuration of a visualization apparatus 200 according to this embodiment.

Next, a specific configuration of the visualization apparatus 200 according to this embodiment as described above will be described. FIG. 2 is a diagram showing one example of a functional configuration of the visualization apparatus 200 for visualizing an order in which elements contained in a structured document displayed on the screen are read. The visualization apparatus 200 according to the embodiment of the present invention includes: a simulation section 202; a simulation result storage section 203; a character string extracting section 205; a display attribute calculating section 210; a character writing direction determining section 215; a directed segment generating section 220; a memory 225; an overlay rendering section 230; an abstraction parameter acquiring section 235; and a synthesizing section 240. Note that FIG. 2 also illustrates an application 250 to display a structured document on the screen of the computer system 50.

The application 250 includes a rendering data generating section 255 and a rendering section 260, and is any application to read a structured document in and display the structured document on the screen of the display device 11. The rendering data generating section 255 generates rendering data by analyzing the structured document thus read in and temporarily stores the generated rendering data in an un-illustrated memory inside the application 250. The rendering section 260 displays text data and image data contained in the structured document on the screen of the display device 11 by referring to the rendering data thus stored in the memory.

The application 250 as described above may be a browser or an application, such as an accessibility checker, having a function of a rendering engine for a browser. In this embodiment, the application 250 will be described as a browser. In this case, the rendering data generating section 255 analyzes the structured document and generates a DOM corresponding to a structure of the structured document. Rendering data generating section 255 stores the DOM in the memory, in the form of a tree structure expressing nesting relationships between objects. Note that data stored in the memory is referred to not only by the rendering section 260, but also by the visualization apparatus 200, or specifically, by the simulation section 202, the character string extracting section 205, the display attribute calculating section 210, and the character writing direction determining section 215, all of which will be described later.

The simulation section 202 simulates how a screen reading application such as a screen reader or a voice browser reads the screen with reference to the above memory inside the application 250. Specifically, the simulation section 202 infers how the content displayed on the screen should be read by the screen reading application such as a screen reader. Then, the simulation section 202 stores elements to be read in the simulation result storage section 203, which will be described later, after arranging the elements in the order of reading the elements, as inferred by the simulation section 202.

In this embodiment, the simulation section 202 simulates how the screen reading application reads the screen in a case where the user does not control positions of content to be read. Then, the simulation section 202 arranges the character strings in the elements to be read in an order in which the elements appear in the structured document, and stores the character strings into the simulation result storage section 203 to be described later. Note that whether or not each element is to be read is determined not based on whether or not the element includes a character string, but in the following manner.

Even in a case of an element including a character string, if the element is not displayed on the screen by being specified as "display:none" in the style sheet, the simulation section 202 determines that the element is not to be read. Additionally, in cases of elements such as IMG and AREA, the simulation section 202 extracts character strings specified as alt attributes, and sets the character strings as elements to be read. Furthermore, in a case where there is a link containing only an image on which no alt attribute is specified, the screen reading application such as a screen reader determines the link to be important, and adopts a part of a URL as a character string to be read. Therefore, the simulation section 202 also extracts the part of the URL, and sets the part as an element to be read.

The simulation result storage section 203 stores therein a result of the simulation by the simulation section 202 on how the screen is read. The simulation result stored in the simulation result storage section 203 is utilized by the character string extracting section 205 to be described later.

By referring to the above memory inside the application 250 and the simulation result stored in the simulation result storage section 203, the character string extracting section 205 extracts, out of the plural elements in the structured document that is read in by the application 250 and displayed on the display device 11, all of elements each including a character string that the screen reading application such as the screen reader or the voice browser is to read. The elements thus extracted and information on character strings corresponding thereto are arranged in an order, as inferred by the simulation section 202, in which the screen reading application reads the elements. Then, the extracted elements and the information are passed to the display attribute calculating section 210, the character writing direction determining section 215, and the directed segment generating section 220, all of which will be described later. Note that the order, as inferred by the simulation section 202, in which the screen reading application reads the elements will be hereinafter mentioned as the order in which the screen reading application reads the elements, or simply as the reading order.

Here, each element in the structured document, on which the character string extracting section 205 performs processing in a unit, may be any part of the structured document as described above, the part being one character, one line, one image, one control, one node, one element, or the like. Note that each element in the structured document on which the character string extracting section 205 performs processing in a unit is also used as a unit for directed segment generation processing to be described. Therefore, in view of accurate expression of a flow of the reading order, it is preferable if the element is smaller.

However, it is difficult to acquire information on which rectangular region one character is rendered. Consequently, in reality, an element in the structured document to be subjected to processing in a unit is determined for the convenience of implementation at the implementation and in view of effective calculation processing. In this embodiment, an element in the structured document to be subjected to processing in a unit is set to one node. Note that, hereinafter, an element in the structured document to be subjected to processing in a unit will be referred to simply as an element in the structured document.

By referring to the above memory inside the application 250, the display attribute calculating section 210 calculates a display attribute of each element to read received from the character string extracting section 205. Here, the display attribute of the element means positions and a size of the element. Such positions and a size of the element are subject to change depending on a window size of the application 250. Therefore, after the application 250 completes the reading in and rendering of the structured document, the display attribute calculating section 210 calculates the display attribute by referring to rendering data generated by the rendering data generating section 255. Information on the thus calculated display attribute of the element is passed to the directed segment generating section 220 to be described later.

Note that, in a case where the application 250 is a browser as in this embodiment, the display attribute can be calculated by use of a standard interface defined by W3C. W3C defines that each element in the structured document has, as style information, an attribute (offsetLeft, offsetTop) of a position relative to a display position of a parent element thereof. Accordingly, for example, in a case of using Javascript, the attribute of the relative position can be referred to by being specified as element.style.offsetLeft. Note that, it is the relative position that can be acquired. For acquiring an absolute position, calculation has to be made by sequentially tracking parent elements.

Figure 3:
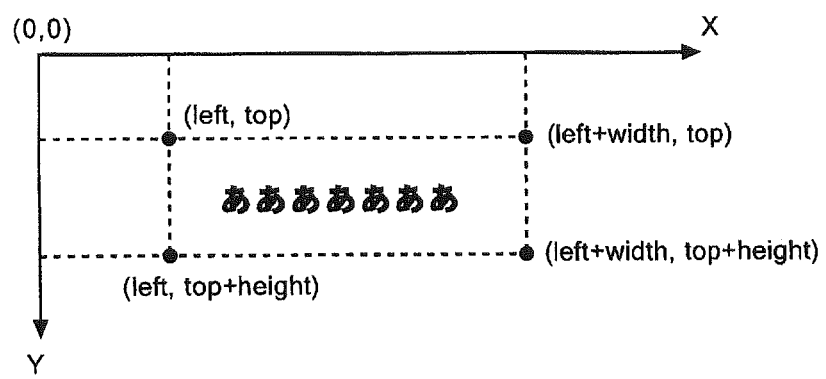
FIG. 3 shows one example of a display attribute.

By taking an element including a character string "AAAAAAA", FIG. 3 shows positions and a size of the element which are calculated by the display attribute calculating section 210. In this case, the calculated positions of the element are: (left, top), (left, top+height), (left+width, top), and (left+width, top+height). Additionally, the size of the element to be calculated is width×height. By referring to the above memory inside the application 250, the character writing direction determining section 215 determines a writing direction of character strings in each of the elements on the basis of any of the language information on a language setting and writing direction information indicating a writing direction, the language information and writing direction information being specified in the structured document. Information on the thus determined writing directions of the elements is passed to the directed segment generating section 220 to be described later.

For example, in an HTML document, a language used therein, and a writing direction are specified by a lang attribute, and a dir attribute, respectively. Specifically, in a case of lang="ja", the language used therein is Japanese. In addition, any one of ltr and rtl can be set as the dir attribute. In a case of dir="ltr", the writing direction is from left to right (left-to-right). On the other hand, in a case of dir="rtl", the writing direction is from right to left (right-to-left). Note that these two attributes can be specified for almost all of elements, and are inherited from a parent element thereof in a case where these attributes are not specified for the element.

Additionally, a setting for display of vertical writing is made by providing an element, for which vertical writing is desired, with a style attribute and specifying "writing-mode: tb-rl" as a value of the attribute. Here, tb-rl indicates that characters flow from top to bottom and then from right to left within the element (top-to-bottom and then right-to-left). Note that "writing-mode:lr-tb" is given as a default value of the attribute, which indicates that characters flow from left to right and then from top to bottom within the element (left-to-right and then top-to-bottom).

In this respect, in a case where the writing direction information is acquirable, the character writing direction determining section 215 determines a writing direction of a character string in an element on the basis of the writing direction information. On the other hand, in a case where only the language information is acquirable, the character writing direction determining section 215 determines the writing direction on the basis of the language information. For example, in a case where the language information indicates the language as Japanese or English, the character writing direction determining section 215 determines the writing direction to be lateral from left. On the other hand, in a case where the language information indicates a language as Arabic, the character writing direction determining section 215 determines the writing direction to be lateral from right.

For each of the plural elements which is received from the character string extraction section 205 and includes a character string to be read by the screen reading application, the directed segment generation section 220 generates a directed segment in a display position on the basis of: information received from the display attribute calculation section 210 on the display attributes of each element; and a writing direction received from the character writing direction determining section 215 of the character string in each element. The display position is an element region on the screen in which the character string of the corresponding element is displayed and the directed segment indicates the writing direction of the character string. The directed segments thus generated are stored in the memory 225 after being arranged in the order in which the screen reading application reads the elements corresponding thereto.

Figure 4A:
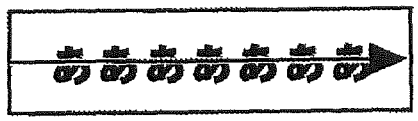
FIG. 4A shows one example of a directed segment.
Figure 4B:
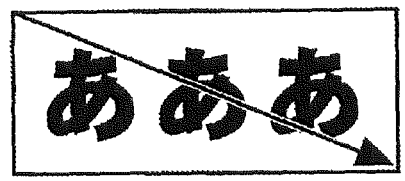
FIG. 4B shows another example of a directed segment.

In one example, under the condition that an element is to be written in a lateral writing direction and is in an rectangular element region, if the rectangular element region has a height less than a given height, the directed segment generation section 220 generates a directed segment for the element as a segment indicating the writing direction and extending horizontally in the rectangular element region (refer to FIG. 4A). Likewise, under the condition that an element is to be written in a lateral writing direction and is in a rectangular element region, if the rectangular element region has a height not less than the given height, the directed segment generation section 220 generates a directed segment for the element as a segment indicating the writing direction and extending diagonally in the rectangular element region (refer to FIG. 4B).

In another example, if an element is in a rectangular element region and is to be written in a lateral writing direction, under the condition that the rectangular element region has a height not less than a given height, the directed segment generation section 220 generates a directed segment for the element as a segment indicating the writing direction and extending diagonally in the rectangular element region. Likewise, under the condition that an element is in a rectangular element region and is to be written in a vertical writing direction, if the rectangular element region has a width not less than a given width, the directed segment generation section 220 generates a directed segment for the element as a segment indicating the writing direction and extending diagonally in the rectangular element region.

Figure 4C:
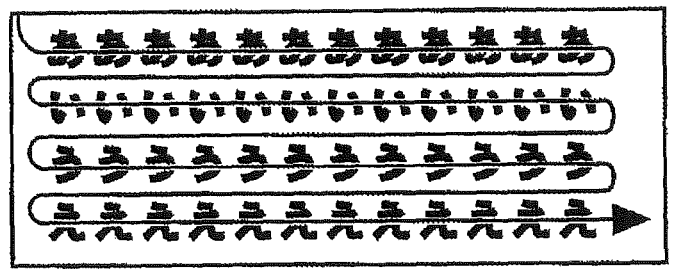
FIG. 4C shows still another example of a directed segment.

Here, each directed segment is generated for the purpose of expressing a flow of a character string in an element corresponding thereto. Accordingly, in so far as the directed segment appropriately expresses the flow of the character string in the corresponding element, the directed segment may not only be a straight line but also be a curve, or be a partially curved segment. For example, in a case where there is a character string in a block element such as "div", the character string is displayed in plural lines with line breaks inserted between the lines. According to this embodiment, an entire region of the block element which covers plural lines and corresponds to one node forms one element region. In such a case, a segment that extends from left to right plural times within the one element region may be generated as a directed segment (refer to FIG. 4C).

Figure 4D:
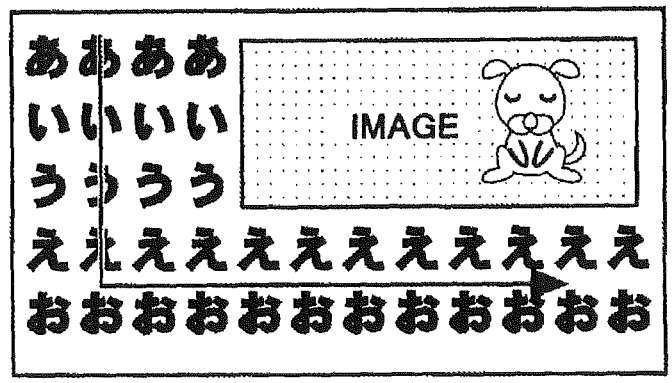
FIG. 4D shows even still another example of a directed segment.

Additionally, in a case where an image specified as "float" exists within a block of a block element, a text is sometimes displayed in an L-shaped region surrounding the image. In such a case, a segment bending in an L-shape may be generated as a directed segment (refer to FIG. 4D).

Figure 5:
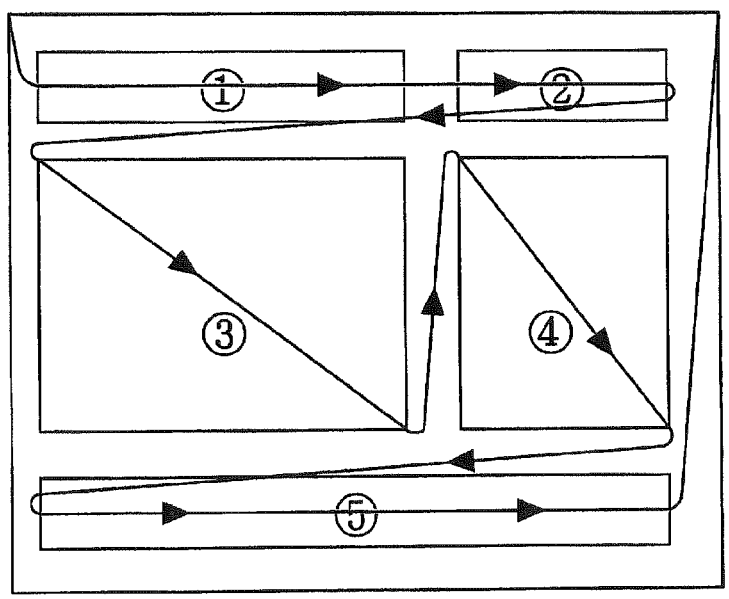
FIG. 5 shows one example of directed segments linked together.

In accordance with the order in which the screen reading application reads the elements, the overlay rendering section 230 reads out directed segments corresponding to the elements from the memory 225, and sequentially links the directed segments together. Then, the overlay rendering section 230 displays the directed segments overlaid on the structured document displayed on the screen of the display device 11. The linking of the directed segments by the overlay rendering section 230 may be carried out by sequentially connecting the directed segments with straight lines, or may be carried out in such a manner that the directed segment obtained by linking has a smoothly traversable form by use of second-order or third-order Bezier curves (refer to FIG. 5).

For example, suppose a case where two directed segments A and B are adjacent to each other in the reading sequence, the directed segments A and B are linked together through a third-order Bezier curve. In one example, a curve from a midpoint of the directed segment A to a midpoint of the directed segment B can be expressed by two Bezier curves. One of the two Bezier curves is defined with control points set to: the midpoint of the directed segment A; an ending point of the directed segment A; the ending point of the directed segment A; and a midpoint between the ending point of the directed segment A and a starting point of the directed segment B. The other one of the two Bezier curves is defined with control points set to the midpoint between the ending point of the directed segment A and the starting point of the directed segment B; the starting point of the directed segment B; the starting point of the directed segment B; and a midpoint of the directed segment B.

As described above, a directed segment of each element is provided to express a flow of an order in which a character string in the element is read. In addition to that, with the overlay rendering section 230 linking corresponding directed segments together, a flow of a reading order of elements is also expressed. Note that an arrow indicating an orientation of a directed segment may be added to the directed segment in order that an orientation of a flow of a reading order can be emphasized. Alternatively, an arrow indicating a reading order of adjacent two elements may be added to a linking segment, which is generated to link two directed segments (refer to FIG. 5).

The abstraction parameter acquisition section 235 acquires from a user, via input means such as the keyboard 6 or the mouse 7, an abstraction parameter indicating a level of abstraction applied in displaying directed segments. For example, when the number of elements shown on the screen at one time is large, the number of directed segments shown being overlaid on character strings in the elements is accordingly large, thus causing the screen to be visually complicated. To address this, in this embodiment, in a case where the screen is visually complicated with directed segments shown being overlaid, two directed segments are abstracted by being integrated together on the basis of the abstraction level specified by the user.

The level to which directed segments are abstracted is determined by a value of the abstraction parameter acquired from the user. That is, by use of the value of the abstraction parameter, the abstraction parameter acquisition section 235 calculates a target number of directed segments after the abstraction. In one example, acquisition of the abstraction parameter may be carried out by displaying on the screen a scroll bar slider used for adjusting the abstraction level of the directed segments so as to cause the user to specify a position of the slider. For example, in a case where a 10-level slider is provided as the above slider, the target number of directed segments after the abstraction may be determined as any one of 100%, 90%, 80% and so on of the number of corresponding elements in accordance with a position of the slider.

Figure 6A:
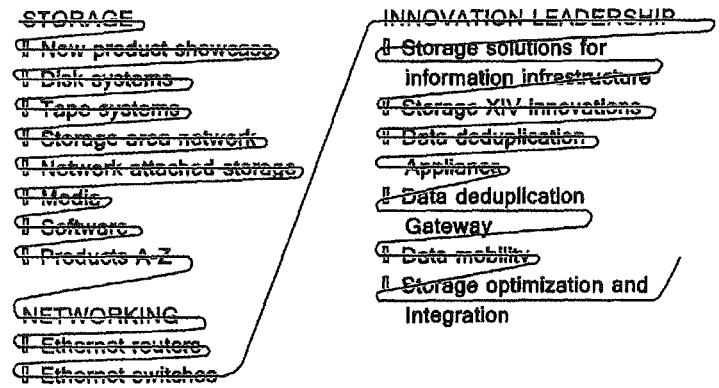
FIG. 6A shows one example of the linked directed segments before being subjected to synthesizing processing.
Figure 6B:
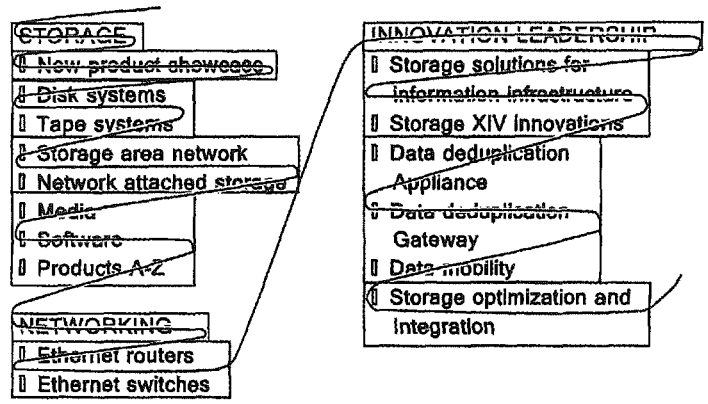
FIG. 6B shows one example of the linked directed segments obtained after the synthesizing processing.
Figure 6C:
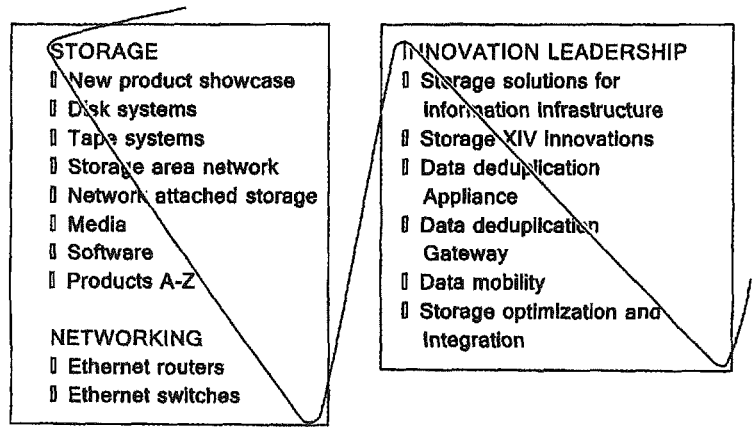
FIG. 6C shows another example of the linked directed segments obtained after the synthesizing processing.

FIGS. 6A to 6C show examples of linked directed segments before and after processing of abstraction. FIG. 6A shows one example of the linked directed segments before the abstraction processing. FIG. 6B shows one example of the linked directed segments after processing of moderate-level abstraction. FIG. 6C shows one example of the linked directed segments after processing of abstraction of higher-level abstraction. As can be seen from FIGS. 6A to 6C, the higher the abstraction level is, the easier the screen is to understand, whereas the lower the abstraction level is, the more in detail the flow of the reading order is displayed on the screen.

Additionally, by taking into consideration a case where the number of elements shown on the screen at one time is small, the minimum number of directed segments may be previously provided in the abstraction parameter acquisition section 235. For example, when the number of elements shown on the screen at one time is 1000, the number of directed segments is only reduced to 100 even if the target number of directed segments after the abstraction is set to 10% of the number of the elements with the highest abstraction level being specified by use of the slider. However, when the number of elements shown on the screen at one time is only 50, the number of directed segments is reduced to 5 if the target number of directed segments after the abstraction is set to 10% of the number of the elements with the highest abstraction level being specified. To address this, if the minimum number of directed segments is previously set to 20, for example, the number of directed segments can be adjusted so as not to be less than 20. Note that the target number of directed segments after the abstraction, which is calculated by the abstraction parameter acquisition section 235, and the minimum number of directed segments, are passed to the synthesizing section 240 to be described later.

The synthesizing section 240 reads out a combination of two directed segments from the memory 225, the combination of two directed segments corresponding to a combination of two elements adjacent to each other in the reading order of character strings in the elements. The synthesizing section 240 then synthesizes the combination of the two directed segments. The reading out and synthesizing is performed until the number of directed segments stored in the memory 225 is reduced to the number corresponding to the abstraction level indicated by the abstraction parameter, or until there is no synthesizable directed segments left in the memory 225. Then, in accordance with a result of the synthesizing, the synthesizing section 240 updates directed segments stored in the memory 225. In response to this updating, the overlay rendering section 230 again reads out directed segments for each element from the memory 225, and links the directed segments together, according to the order in which the screen reading application reads the elements. Then, the overlay rendering section 230 displays the linked directed segments overlaid on the structured document displayed on the display device 11.

Figure 7A:
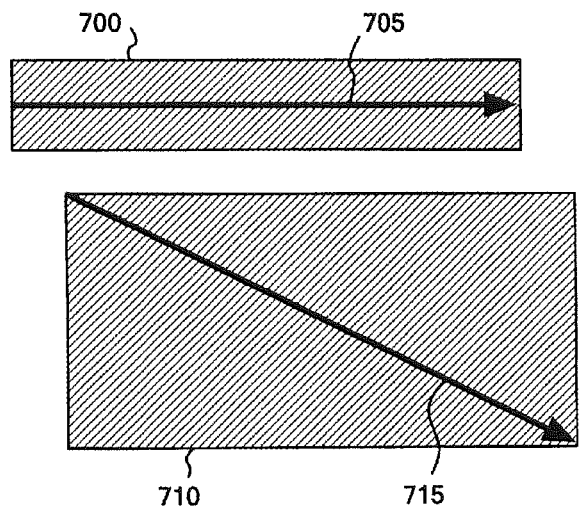
FIG. 7A shows one example of two directed segments before being subjected to synthesizing processing.
Figure 7B:
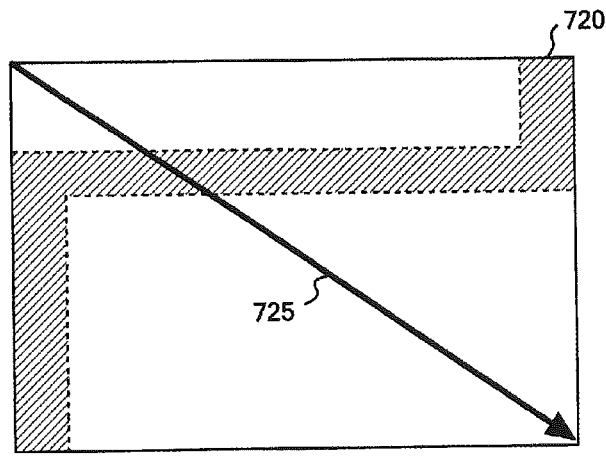
FIG. 7B shows one example of a directed segment obtained after the synthesizing processing.

Here, the synthesizing of a combination of two directed segments is preferably carried out by generating a directed segment for a minimum region encompassing element regions for these directed segments. This synthesizing will be described with reference to FIGS. 7A and 7B. Firstly, suppose there is a combination of two directed segments 705 and 715, which corresponds to a combination of two elements 700 and 710 adjacent to each other in the reading order, as shown in FIG. 7A. Note that, in FIGS. 7A and 7B, directed segments are assumed to be generated according to the method described with reference to FIGS. 4A and 4B. Then, the synthesizing is carried out by generating a directed segment for a minimum region 720 encompassing the two corresponding element regions 700 and 710, whereby the directed segment generated by the synthesizing is obtained as a diagonal line 725, which is oriented from top to bottom, in a minimum rectangular region 720.

Note that, some combinations each consisting of two directed segments are synthesized into directed segments capable of appropriately expressing flows of character strings in corresponding elements, whereas some thereof are synthesized into directed segments incapable of appropriately expressing flows of character strings in corresponding elements. Consequently, in this embodiment, the synthesizing processing is preferentially performed on combinations each consisting of two directed segments synthesized into a directed segment capable of appropriately expressing a flow of character strings in corresponding elements. Additionally, in this embodiment, any combination of two directed segments synthesized into a directed segment incapable of appropriately expressing a flow of character strings in corresponding elements is not subjected to the synthesizing processing.

A combination of two directed segments prohibited from being synthesized is discriminated in the following specific manner. Specifically, in this embodiment, each combination of two directed segments a and b adjacent to each other in the reading order is judged as to whether at least any one of positional relationships defined below as (A1) and (A2), respectively, holds true between the two directed segments a and b. If at least any one of the positional relationships defined as (A1) and (A2) holds true in a combination between the two directed segments, the combination is not subjected to the synthesizing processing. Note that, in the following, a character string corresponding to the directed segment a is assumed to come earlier in the reading order than a character string corresponding to the directed segment b.

(A1) In a case where a horizontal component of a writing direction is oriented from left to right, an element region corresponding to the directed segment b is located to the left or above an element region corresponding to the directed segment a. In a case where the horizontal component of the writing direction is oriented from right to left, the element region corresponding to the directed segment b is located to the right or above the element region corresponding to the directed segment a.

(A2) The element regions corresponding to the directed segments a and b are distant from each other by a given distance or more.

Figure 8A:
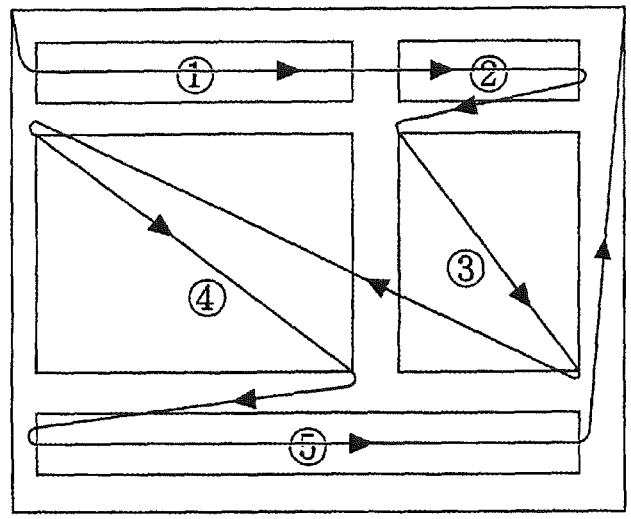
FIG. 8A shows one example of a first case where synthesizing directed segments is prohibited.
Figure 8B:
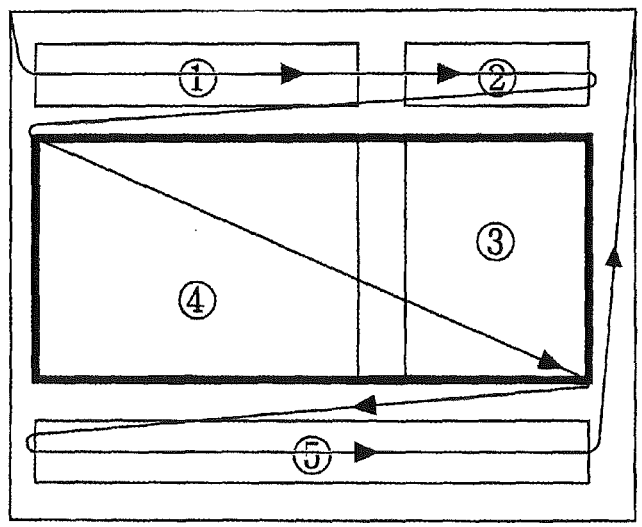
FIG. 8B shows one example of a directed segment obtained after the directed segments are synthesized in the first case shown in FIG. 8A.

FIGS. 8A and 8B are diagrams showing one example of a case where the combination of the adjacent two directed segments a and b satisfies the positional relationship defined in (A1) such that "in a case where the horizontal component of the writing direction is oriented from left to right, the element region corresponding to the directed segment b is located to the left of the element region corresponding to the directed segment a".

In FIG. 8A, a numbered rectangular region indicates an element region of each element, and a segment in the element region indicates a directed segment corresponding to the element. Additionally, numbers given to the rectangular regions indicate a reading order of the elements corresponding thereto. In FIG. 8A, a combination of directed segments corresponding to element regions numbered 3 and 4 satisfies the above positional relationship. A directed segment obtained by synthesizing the combination of these directed segments is shown in FIG. 8B. As can be seen from FIG. 8B, the directed segment obtained by the synthesizing is oriented from the element region numbered 4 to the element region numbered 3, and therefore does not appropriately express the order, as indicated before the synthesizing, of reading these elements.

Figure 9A:
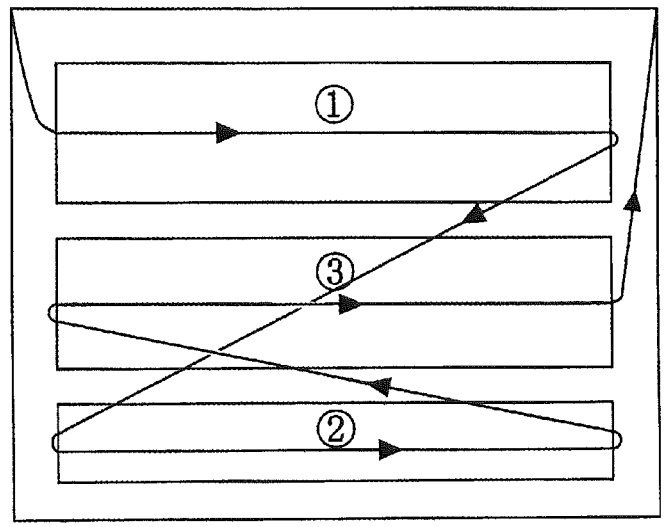
FIG. 9A shows one example of a second case where synthesizing directed segments is prohibited.
Figure 9B:
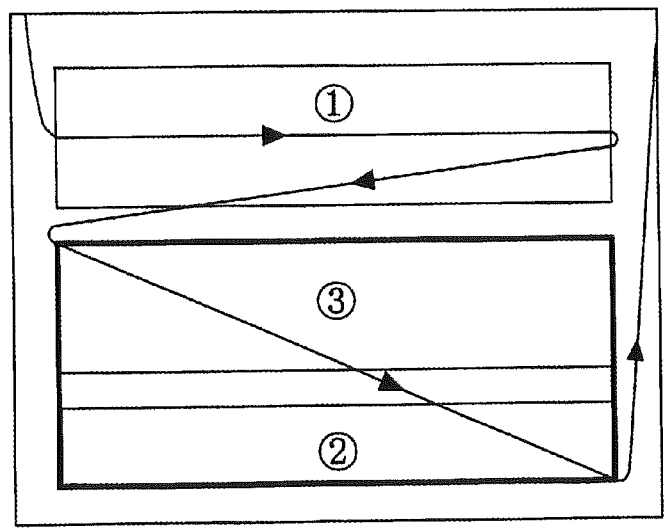
FIG. 9B shows one example of a directed segment obtained after the directed segments are synthesized in the second case shown in FIG. 9A.

FIGS. 9A and 9B are diagrams showing one example of a case where the combination of the adjacent two directed segments a and b satisfies the positional relationship defined in (A1) such that "in a case where the horizontal component of the writing direction is oriented from left to right, the element region corresponding to the directed segment b is located above the element region corresponding to the directed segment a".

In FIG. 9A, a numbered rectangular region indicates an element region of each element, and a segment in the element region indicates a directed segment corresponding to the element. Additionally, numbers given to the rectangular regions indicate a reading order of the elements corresponding thereto. In FIG. 9A, a combination of directed segments corresponding to element regions numbered 2 and 3 satisfies the above positional relationship. A directed segment obtained by synthesizing the combination of these directed segments is shown in FIG. 9B. As can be seen from FIG. 9B, the directed segment obtained by the synthesizing is oriented from the element region numbered 3 to the element region numbered 2, and therefore does not appropriately express the order, as indicated before the synthesizing, of reading these elements.

Figure 10A:
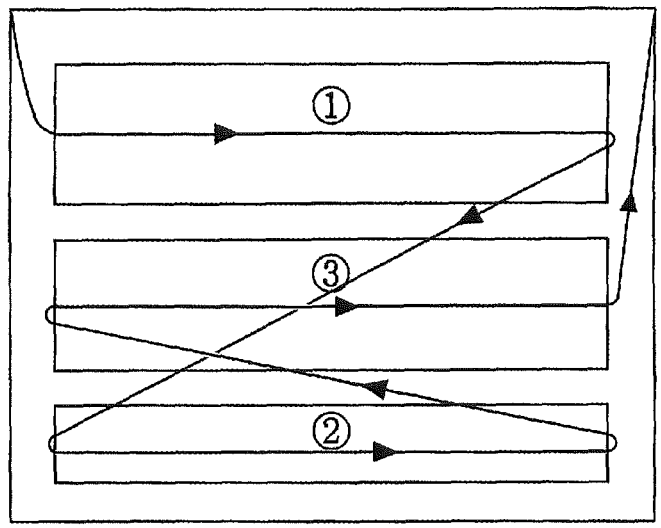
FIG. 10A shows one example of a third case where synthesizing directed segments is prohibited.
Figure 10B:
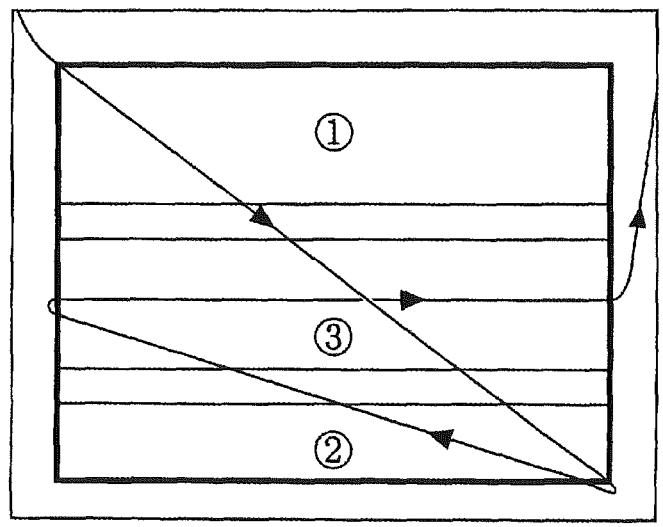
FIG. 10B shows one example of a directed segment obtained after the directed segments are synthesized in the third case shown in FIG. 10A.

FIGS. 10A and 10B are diagrams showing one example of a case where the combination of the adjacent two directed segments a and b satisfies the positional relationship defined in (A2) such that "the element regions corresponding to the directed segments a and b are distant from each other by a given distance or more".

In FIG. 10A, a numbered rectangular region indicates an element region of each element, and a segment in the element region indicates a directed segment corresponding to the element. Additionally, numbers given to the rectangular regions indicate a reading order of the elements corresponding thereto. In FIG. 10A, a combination of directed segments corresponding to element regions numbered 1 and 2 satisfies the above positional relationship.

A directed segment obtained by synthesizing the combination of these directed segments is shown in FIG. 10B. As can be seen from FIG. 10B, the directed segment obtained by the synthesizing intersects a directed segment corresponding to an element region numbered 3 located between the element regions numbered 1 and 2, thereby causing confusion of a flow of the reading order.

On the other hand, combinations each consisting of two directed segments which are to be preferentially subjected to the synthesizing processing are discriminated in the following specific manner. Note that the discrimination is carried out in parallel to discrimination of combinations of directed segments prohibited from being synthesized, or after excluding inappropriate combinations in which synthesizing should be prohibited. In this embodiment, for each combination of two directed segments adjacent to each other in the reading order, weights W1 to W4 are calculated based on the following judgment criteria (B1) to (B4), respectively. Then, a sum of the weights W1 to W4 calculated based on the respective judgment criteria (B1) to (B4) is found, and the synthesizing processing is applied to a combination which gives the smallest sum.

Note that, in this embodiment, all of the element regions of elements corresponding to any directed segments X are assumed to be rectangular. Additionally, any combination of two directed segments, which is subjected to the judgment, is assumed to be a combination of directed segments a and b. For any directed segment X, a width and a height of an element region corresponding thereto are denoted as X.width and X.height, respectively, and leftmost and topmost coordinates of the element region on the screen from a front view thereof are denoted as (X.left, X.top). Furthermore, the following expressions are used: dw=a.width−b.width; dh=a.height−b.height; dl=a.left−b.left; dt=a.top−b.top; and, X.area=X.width×X.height.

(B1) The synthesizing is preferentially performed on a combination of two directed segments more similar to each other in orientation and size:

$$W1=dw^2+dh^2.$$

(B2) The synthesizing is preferentially performed on a combination of two directed segments if two element regions corresponding thereto are horizontally or vertically lined up. In applying this criterion, horizontally continuing elements are given higher priority by setting $K_v > K_h$:

$$W2=K_v \times dl + K_h \times dt.$$

(B3) The synthesizing is preferentially performed on a combination of two directed segments if a minimum region encompassing two element regions corresponding to the two directed segments is closer to a union of the two element regions:

$$W3=c.\text{area}-(a.\text{area}+b.\text{area}).$$

(B4) The synthesizing is preferentially performed on a combination of two directed segments if a union of two element regions corresponding to the two directed segments is smaller:

$$W4=a.\text{area}+b.\text{area}.$$

Note that, once the synthesizing processing is performed, values of the weights change for a combination in which a directed segment is paired with a directed segment obtained by the synthesizing. Therefore, before the next synthesizing processing is performed, the weights are recalculated for two combinations prior to and subsequent to the combination including the directed segment obtained by the synthesizing, since the weights for the two combinations change. Then, a combination that gives the smallest sum of weights is found again, and the synthesizing processing is performed on the combination. The synthesizing section 240 repeats the above processing until the number of directed segments stored in the memory 225 is reduced to the number corresponding to the abstraction level indicated by the abstraction parameter, or until there is no synthesizable directed segments left in the memory 225.

Upon receipt from the abstraction parameter acquisition section 235 a new target number of directed segments after the abstraction, the synthesizing section 240 starts over the synthesizing processing on the basis of the new target number of directed segments after the abstraction.

Next, operations of the visualization apparatus 200, which is for visualizing an order of reading elements contained in a structured document, will be described with reference to FIGS. 11 to 13. Note that the operations of the visualization apparatus 200 start after the application 250 reads the structured document in, and renders the structured document on the screen of the display device 11. Here, the structured document may be one received from another computer on a network via the network adapter 18 or the like, or may be one stored in a storage such as the hard disk 13 or 30.

Figure 11:
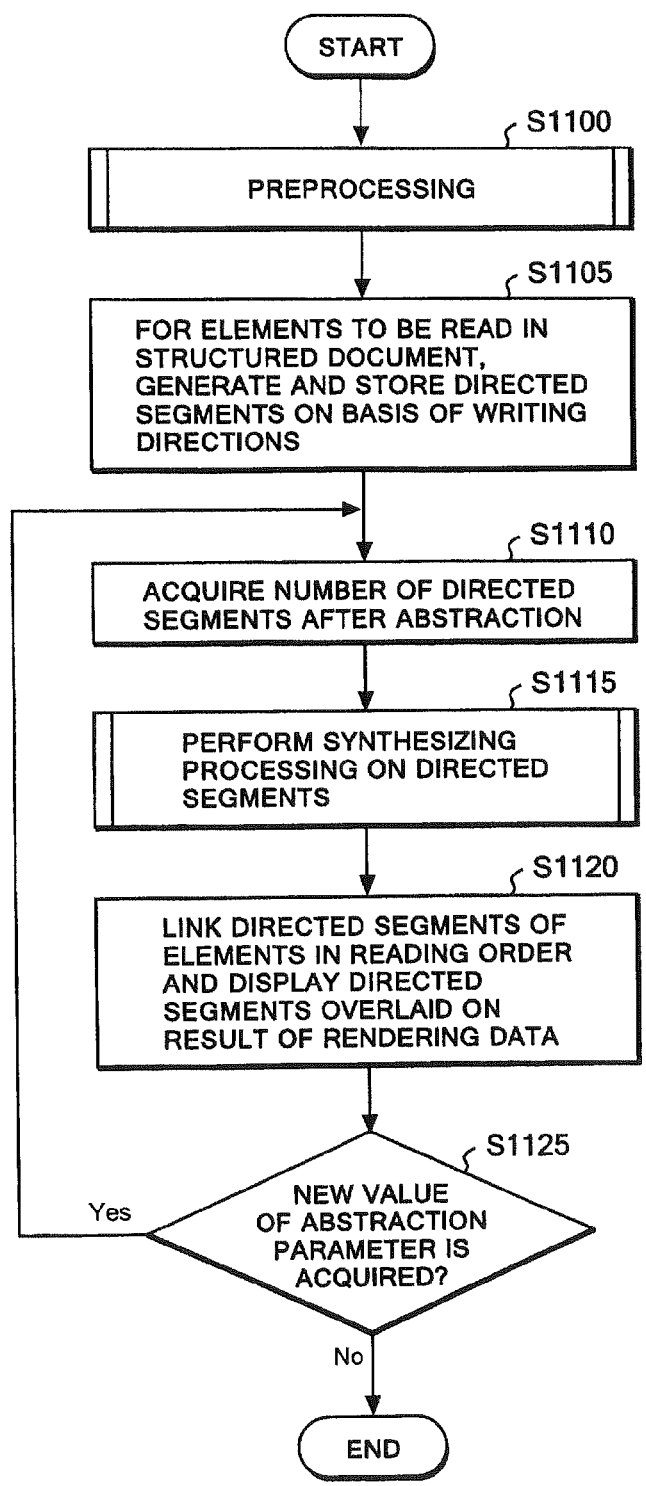
FIG. 11 shows a flowchart according to this embodiment, which shows one example of a flow of processing performed for visualizing an order in which elements in a structured document displayed on a screen are read.

In FIG. 11, processing starts from step 1100. In response to the rendering of the structured document by the application 250, the visualization apparatus 200 performs preprocessing for visualization of the reading order. Note that details of the preprocessing will be described later with reference to FIG. 12. Next, for each of plural elements which includes a character string to be read by a screen reading application, the directed segment generation section 220 of the visualization apparatus 200 generates directed segments on the basis of writing directions of the character strings in the respective elements.

The generated directed segments are displayed in display positions that are element regions of the respective elements, and indicate the writing directions (step 1105). The directed segments thus generated are stored in the memory 225 by the directed segment generating section 220 after being arranged thereby in an order in which the screen reading application reads the respective elements.

Next, in step 1110, the abstraction parameter acquiring section 235 of the visualization apparatus 200 acquires a value of the abstraction parameter from a user via an input device such as the mouse 7, and calculates, on the basis of this value of the abstraction parameter, a target number of directed segments after the abstraction. The calculated target number of directed segments after the abstraction is passed, together with the minimum number of directed segments after the abstraction, from the abstraction parameter acquiring section 235 to the synthesizing section 240 of the visualization apparatus 200.

Subsequently, the processing proceeds to step 1115, where the synthesizing section 240 reads out a combination of two directed segments from the memory 225 and synthesizes the combination, the two directed segments corresponding to a combination of two elements adjacent to each other in the reading order of elements. In this step, this reading out and synthesizing is performed until the number of directed segments stored in the memory 225 is reduced to the number corresponding to the abstraction level indicated by the abstraction parameter, or until there is no synthesizable directed segments left in the memory 225. Then, the synthesizing section 240 updates information on directed segments stored in the memory 225 with information on directed segments obtained by the synthesizing. Note that details of processing of the synthesizing will be described later with reference to FIG. 13.

Next, the overlay rendering section 230 of the visualization apparatus 200 reads out directed segments corresponding to the elements from the memory 225, and links the directed segments together, according to the order in which the screen reading application reads character strings contained in the elements. Then, the overlay rendering section 230 displays the thus linked directed segments overlaid on data of the structured document displayed on the display device 11 (step 1120). Then, the abstraction parameter acquiring section 235 determines whether there is a new value of the abstraction parameter inputted by the user (step 1125). If there is a new value of the abstraction level specified by the user (YES in step 1125), the processing returns to step 1110. On the other hand, if there is no new value of the abstraction level specified by the user (NO in step 1125), the processing ends.

Figure 12:
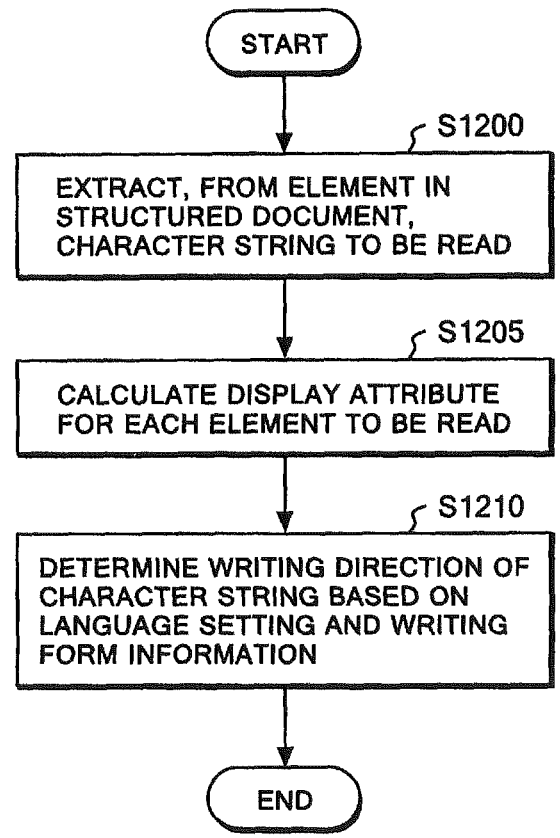
FIG. 12 shows a flowchart showing one example of a flow of preprocessing for step 1100 in the flowchart shown in FIG. 11.

FIG. 12 shows one example of a flow of the preprocessing for step 1100 in the flowchart shown in FIG. 11. Processing starts from step 1200, where the character string extraction section 205 of the visualization apparatus 200 extracts, out of each element in the structured document, a character string to be read by an application. Subsequently, the display attribute calculating section 210 of the visualization apparatus 200 calculates a display attribute, such as a position and a size for each element, received from the character string extracting section 205, to be read (step 1205). The display attributes of the element thus calculated are passed from the display attribute calculating section 210 to the directed segment generating section 220.

Subsequently, the processing proceeds to step 1210. In this step, the character writing direction determining section 215 of the visualization apparatus 200 determines a writing direction of a character string in the element to be read. This determination is based on any one of language information on a language setting and writing direction information indicating a writing direction, the language information and writing direction information being specified within the structured document. The writing direction of the element thus determined is passed to the directed segment generating section 220. Then, the processing ends.

Figure 13:
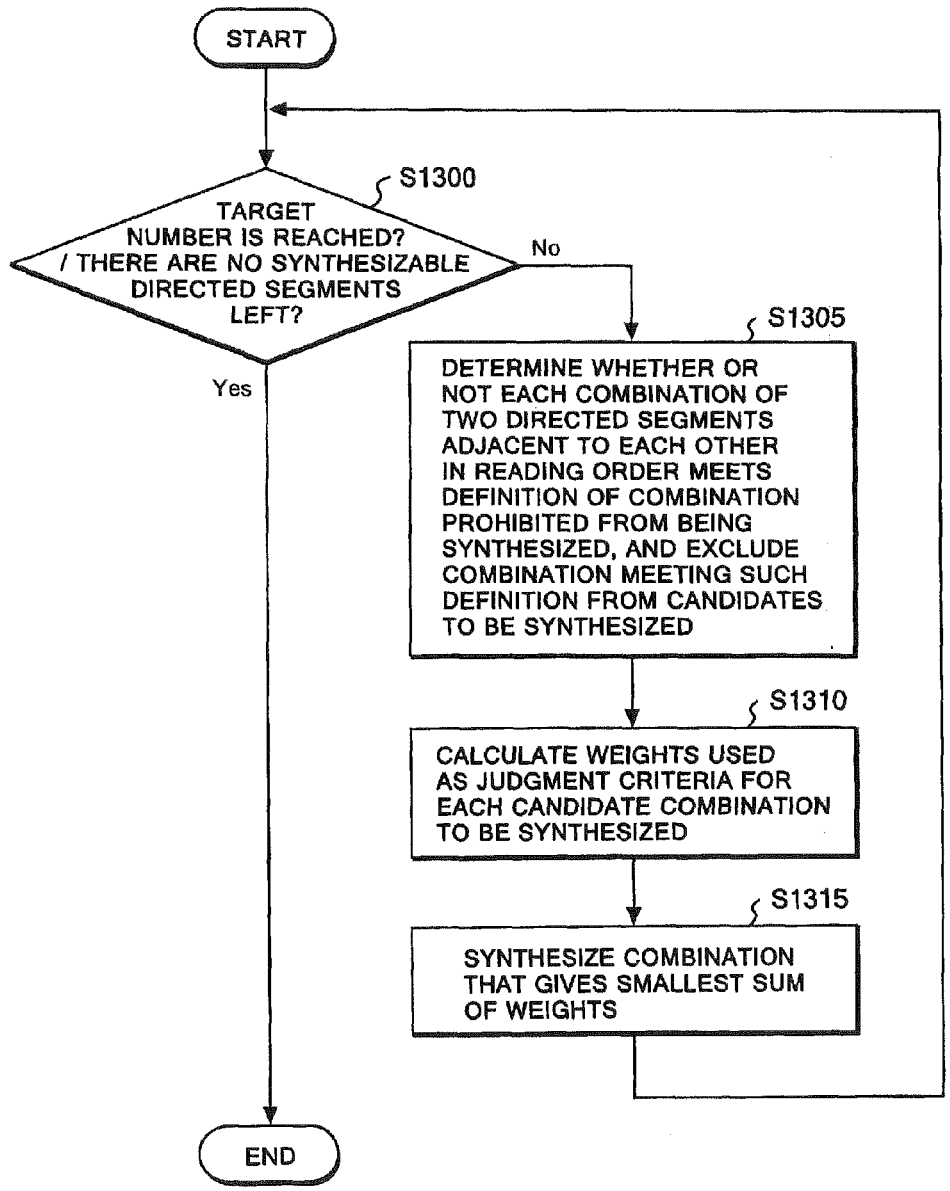
FIG. 13 shows a flowchart showing one example of a flow of processing of synthesizing directed segments in step 1115 in the flowchart shown in FIG. 11.

FIG. 13 shows one example of a flow of the synthesizing processing in step 1115 in the flowchart shown in FIG. 11. The processing starts from step 1300, where the synthesizing section 240 of the visualization apparatus 200 determines whether or not at least any one of the following conditions is satisfied: that the number of directed segments stored in the memory 225 has already reached the number corresponding to the abstraction level indicated by the abstraction parameter; and that there is no synthesizable directed segments left in the memory 225. If the number of directed segments stored in the memory 225 has already reached the number corresponding to the abstraction level indicated by the abstraction parameter, or if there is no synthesizable directed segments left in the memory 225 (YES in step 1300), the processing ends.

On the other hand, in the case of NO in step 1300, the processing proceeds to step 1305, where the synthesizing section 240 determines whether or not each combination of two directed segments among the plural directed segments stored in the memory 225 meets definition of a combination prohibited from being synthesized, the two directed segments being adjacent to each other in the order in which the screen reading application reads character strings contained in the elements. More specifically, the synthesizing section 240 determines whether or not a combination of element regions of elements corresponding to the two directed segments satisfies any one of the above described positional relationships defined as (A1) and (A2). Then, upon determining that the combination does, the synthesizing section 240 excludes the combination of the two directed segments from candidates to be synthesized.

Next, for each combination of two directed segments adjacent to each other in the reading order, which does not include the combination excluded in step 1305 from the candidates to be synthesized, the synthesizing section 240 calculates the above described weights W1 to W4 used as the judgment criteria in the synthesizing, and then temporarily stores a sum thereof (step 1310). Then, the synthesizing section 240 executes the synthesizing processing on a combination of such two directed segments that give the smallest sum of the weights W1 to W4 (step 1315). Then, the processing returns to step 1300. Note that, when the processing in steps 1305 and 1310 is performed for the second time and later, the processing should only be performed for the following combinations: a combination of the directed segment obtained by the synthesizing in step 1315 immediately previously performed and a directed segment positioned immediately before, in the reading order, the directed segment obtained by the previous synthesizing; and a combination of the directed segment obtained by the synthesizing in step 1315 immediately previously performed and a directed segment positioned immediately after, in the reading order, the directed segment obtained by the previous synthesizing.

Figure 14A:
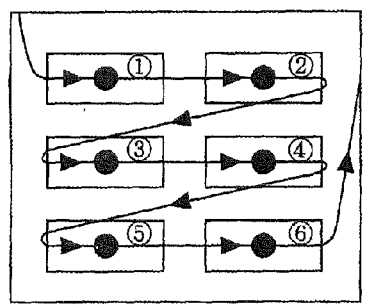
FIG. 14A shows one example of a user interface of a program to which the present invention is applied, the program being designed to interchange sequence numbers in an order in which elements are read.

Next, with reference to FIGS. 14A to 14D, an example in which the present invention is applied to a user interface of a program for changing an order of reading character strings in elements within a structured document. FIG. 14A shows linked directed segments that indicate an original flow of the reading order used before the reading order is changed. Note that FIGS. 14A to 14D show screen images all of which display the same structured document. In each of these drawings, a numbered rectangular region indicates an element region of each of the elements, and numbers given to the rectangular regions indicate an order of reading the corresponding elements. Additionally, in FIGS. 14A to 14D, each black circle within the element region indicates a knob. Here, suppose a case where a sequence number of an element region 3 in the reading order is changed from 3 to 2.

In this case, in order to change linked directed segments oriented from an element region 1 to an element region 2 into linked directed segments oriented from an element region 1 to an element region 3, a knob of the element region 1 is dragged to a knob of the element region 3 by use of an input device such as the mouse 6. FIG. 14B shows the screen image shown at this time. During dragging of any knob, the reading order remains undefined, and thus directed segments other than a directed segment corresponding to an element region whose knob is dragged are hidden. Additionally, the knobs of the respective element regions are displayed as white circles in order to clearly indicate that the reading order is currently being changed.

Figure 14C:
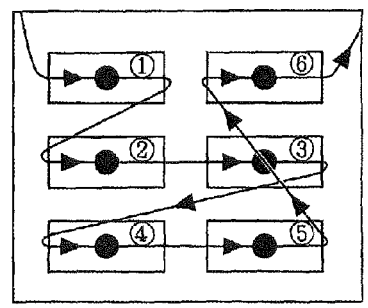
FIG. 14C shows one example of a screen image displayed after the completion of the interchanging shown in FIG. 14B.
Figure 14B:
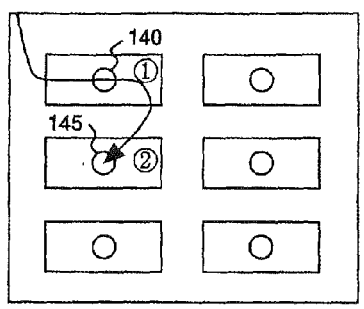
FIG. 14B shows one example of a screen image showing a condition in the middle of interchanging the sequence numbers by using the interface shown in FIG. 14A.

FIG. 14C shows the screen image after the completion of the dragging operation. Since a new reading order is fixed after the completion of the dragging operation, linked directed segments indicating the fixed reading order are displayed again on the screen. Note that this embodiment assumes that an element region skipped by the changing of the reading order is moved down to the last position in the new reading order. Likewise, this embodiment assumes that other element regions to be read, in the original reading order, after a certain element region whose position is changed in the reading order are sequentially advanced by one position in the new reading order in accordance with the new position of the certain element region whose position is changed.

Figure 14D:
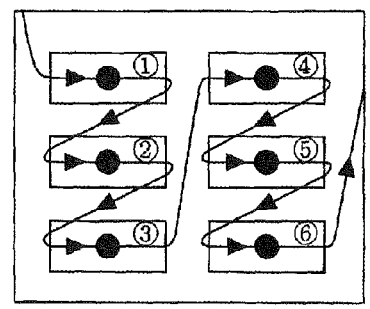
FIG. 14D shows one example of a screen image displayed after all of sequence numbers are interchanged by repeating the same processing as shown in FIG. 14B.

When the reading order is thus changed, the overlay rendering section 230 rearranges, in the new reading order, the directed segments which are currently stored in the memory 225 in the original reading order. For that purpose, the overlay rendering section 230 holds in the memory 225 sequence numbers in the reading order in association with identifiers of knobs, and changes the sequence numbers in the reading order corresponding to the respective knobs in response to a user operation in the above described manner. Then, in accordance with the new reading order, the overlay rendering section 230 reads out directed segments for each element from the memory 225, links the directed segments together. Thereby, the overlay rendering section 230 displays a directed segment obtained by linking in an overlaying manner on the structured document displayed on the display device 11. Then, after all of the sequence numbers in the reading order are changed through repeating the similar processing, the screen image as shown in FIG. 14D is finally displayed.

Although the present invention has been described by way of embodiments thereof, the technical scope of the present invention is not limited to the scope of the above described embodiments. It will be apparent to those skilled in the art that various modifications and improvements may be made therein. Accordingly, it is a matter of course that embodiments including such changes and modifications are also included in the technical scope of the present invention.

It should be noted that execution orders in which operations, procedures, steps, stages, and the like in the apparatus, the system, the program, and the method shown in the scope of claims, the description, and the drawings are processed can be carried out by any appropriate orders unless otherwise particularly defined by use of such expressions as "before" and "prior to" or otherwise used and except for a case where an output of previous processing is used in processing executed later than this previous processing. Even if any operational flow in the scope of claims, the description, or the drawings is described by use of such expressions as "first" and "subsequently" for the sake of convenience, it does not mean that it is imperative to carry out the processing in an order indicated by such expressions.

Although the preferred embodiments of the present invention have been described in detail, it should be understood that various changes, substitutions and alternations can be made therein without departing from spirit and scope of the inventions as defined by the appended claims.

The invention claimed is:

1. A visualization apparatus for determining a reading order in which a screen reading application reads elements contained in a structured document displayed on a screen of a computer system, the apparatus comprising:
    a processing device configured to generate, for each of a plurality of elements, a directed segment which includes a character string to be read by a screen reading application, wherein the directed segment indicates a writing direction and is displayed in an element region in which the character string in the element is displayed on the screen;
    a storage device configured to store the generated directed segments for the elements in the reading order; and
    an overlay rendering section in communication with the storage device, the overlay rendering section configured to link together the directed segments generated for the elements in accordance with the reading order, and to display the linked directed segments overlaid on the structured document.

2. The apparatus according to claim 1, wherein:
    the writing direction is determined on the basis of a language setting; and
    the writing direction is specified within the structured document.

3. The apparatus according to claim 1, wherein: in the event an element is in an element region having a height not less than a given height, the element region has a rectangular shape, and the writing direction therein is lateral, then the directed segment for the element is generated as a segment which indicates the writing direction and extends diagonally in the element region.

4. The apparatus according to claim 1, wherein: in the event an element is in an element region having a width not less than a given width in a case, the element region has a rectangular shape and the writing direction therein is vertical, then the directed segment for the element is generated as a segment which indicates the writing direction and extends diagonally in the element region.

5. The apparatus according to claim 1, wherein:
    in the event an element is in an element region having a height less than a given height, the writing direction is lateral and the element region has a rectangular shape, then the directed segment for the element is generated as a segment which indicates the writing direction and extends horizontally in the element region; or in the event an element is in an element region having a height not less than a given height, the writing direction is lateral and the element region has a rectangular shape, then the directed segment for the element is generated as a segment which indicated the writing direction and extends diagonally in the element region.

6. The apparatus according to claim 1, further comprising:
an abstraction parameter acquiring section in communication with an input device of the computer system, the abstraction parameter acquiring section configured to indicate a level of abstraction according to which the directed segments are displayed;
reading from the storage device a combination of two directed segments for each combination of two elements adjacent in the reading order;
a synthesizing section configured to synthesize the two directed segments in the read combination until the number of the directed segments stored in the storage device is reduced to the number corresponding to an abstraction level indicated by the abstraction parameter, or there are no synthesizable directed segments left in the storage device;
and the synthesizing section configured to update the directed segments stored in the storage device in accordance with a result of the synthesizing.

7. The apparatus according to claim 6, further comprising a directed segment generating section configured to generate a minimum region encompassing the element regions of the two directed segments.

8. The apparatus according to claim 7, wherein the synthesizing of two directed segments is performed on a combination of two directed segments that forms a minimum region which encompasses the corresponding two element regions and is closer to a union of the corresponding two element regions among the directed segments.

9. The apparatus according to claim 6, wherein the synthesizing is performed on a combination of two directed segments which are similar to each other in direction and in size.

10. The apparatus according to claim 6, wherein the synthesizing is performed on a combination of two directed segments that forms a smaller union of the corresponding two element regions.

11. The apparatus according to claim 6, wherein the synthesizing is performed on a combination of two directed segments whose corresponding two element regions are horizontally or vertically lined up.

12. The apparatus according to claim 6, wherein:
the processor is prohibited from synthesizing a combination of two directed segments for a combination of two elements that are adjacent to each other in the reading order, wherein: the horizontal components of the writing directions of the two elements are oriented from left to right and the element region of one of the two elements that comes later in the reading order is located to the left of or above the element region of the other one of the two elements that comes earlier in the reading order; or
the horizontal components of the writing directions of the two elements are oriented from right to left and the element region of one of the two elements that comes later in the reading order is located to the right of or above the element region of the other one of the two elements that comes earlier in the reading order.

13. The apparatus according to claim 6, wherein:
the processor is prohibited from synthesizing a combination of two directed segments for a combination of two elements that are adjacent to each other in the reading order, if one of the two elements that comes earlier in the reading order is displayed at a predetermined or longer distance apart from a position where the other one of the two elements that comes later in the reading order is displayed.

14. The apparatus according to claim 13, wherein, when displayed in an overlaid manner on the structured document, the combination of the two directed segments prohibited from being synthesized is displayed so as to be distinguishable from those of the directed segments that are not prohibited from being synthesized.

15. The apparatus according to claim 1, wherein the directed segments are linked by use of a Bezier curve.

* * * * *